United States Patent [19]

Le Barny et al.

[11] Patent Number: 5,294,463
[45] Date of Patent: Mar. 15, 1994

[54] THERMALLY RETICULATED MATERIALS FOR NON-LINEAR OPTICAL APPLICATIONS

[75] Inventors: Pierre Le Barny, Orsay; Evelyne Chastaing, Saulx les Chartreux; Jean-Claude Dubois, Saint Remy les Chevreuses; Sophie Muller, Palaiseau; Francoise Soyer, Villebon Sur Yvette, all of France

[73] Assignee: Thompson-CSF, Puteaux, France

[21] Appl. No.: 898,098

[22] Filed: Jun. 12, 1992

[30] Foreign Application Priority Data

Jul. 2, 1991 [FR] France ................. 91 08233

[51] Int. Cl.[5] ................. C07D 303/12; C07D 303/32; C08G 63/06; C08G 63/66
[52] U.S. Cl. .................... 427/488; 427/458; 427/493; 427/506; 427/536; 427/544; 427/569; 204/155; 204/156; 204/157.64; 204/157.81; 204/165; 528/100; 528/220; 528/229; 528/327; 528/331; 549/551; 549/557
[58] Field of Search ............. 528/100, 331, 220, 229, 528/327; 549/557, 551; 204/155, 156, 157.64, 157.81, 165; 427/458, 488, 506, 493, 536, 544, 569

[56] References Cited

U.S. PATENT DOCUMENTS

| | | | |
|---|---|---|---|
| 2,925,426 | 2/1960 | Schroeder | 549/557 |
| 3,067,171 | 12/1962 | Hoppe | 549/557 |
| 4,757,130 | 6/1988 | DeMartino | 528/288 |
| 4,764,581 | 8/1988 | Muller et al. | 528/100 |
| 5,182,394 | 1/1993 | Kim | 525/539 |

FOREIGN PATENT DOCUMENTS 0287233 10/1988 European Pat. Off.
0363237  4/1990 European Pat. Off.

*Primary Examiner*—Frederick Krass
*Attorney, Agent, or Firm*—Oblon, Spivak, McClelland, Maier & Neustadt

[57] ABSTRACT

This invention concerns new molecules with active, non-linear optical properties and which can be thermally reticulated (more precisely, these molecules include terminal functions which can be reticulated, attached to either side of the groups active in non-linear optics, which can be oriented under an electrical field). When reticulated and oriented under an electrical field, these materials are particularly stable and can be employed for industrial applications, using non-linear optics (electrooptical modulators, frequency doublers, etc.).

5 Claims, 4 Drawing Sheets

$$CH_2-CH-(-CH_2-)_n-OOC-(-CH_2-)_{\overline{p}}D-\boxed{\phantom{X}}-COO-(-CH_2-)_n CH-CH_2$$
$$\underset{O}{\diagdown\diagup} \qquad\qquad\qquad\qquad\qquad |\qquad\qquad\qquad\qquad\qquad\qquad \underset{O}{\diagdown\diagup}$$
$$A_1$$

OR $$CH_2-CH-(-CH-)_n-OOC-(-CH-)_{\overline{p}}D-\boxed{\phantom{X}}-A_1$$
$$\underset{O}{\diagdown\diagup} \qquad\qquad\qquad\qquad\qquad\qquad\qquad |$$
$$COO-(-CH_2-)_n CH-CH_2$$
$$\underset{O}{\diagdown\diagup}$$

WHERE $1 \leq n \leq 5$
$1 \leq p \leq 5$

D BEING $\underset{C_mH_{2m+1}}{\overset{\diagdown}{N}-}$ WHERE $1 \leq m \leq 5$ OR $-O-$ $A_1$ BEING $-NO_2$ OR $CN$

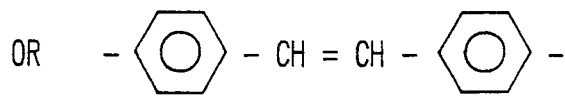

OR 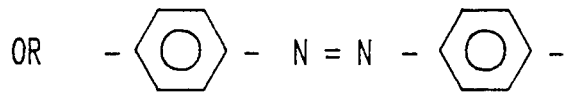

OR $$CH_2-CH-(-CH_2-)_n-OOC-(-CH_2-)_{\overline{p}}D-\boxed{\phantom{X}}-A_2-(-CH_2-)_n CH-CH_2$$
$$\underset{O}{\diagdown\diagup} \qquad\qquad\qquad\qquad\qquad\qquad\qquad\qquad\qquad\qquad\qquad \underset{O}{\diagdown\diagup}$$

WHERE $1 \leq n \leq 5$
$1 \leq p \leq 5$

D BEING $\underset{C_mH_{2m+1}}{\overset{|}{-N-}}$ WHERE $1 \leq m \leq 5$ OR $-O-$ $A_2$ BEING $\underset{O}{\overset{-C-}{\underset{\|}{\phantom{X}}}}$ OR $-COO-$

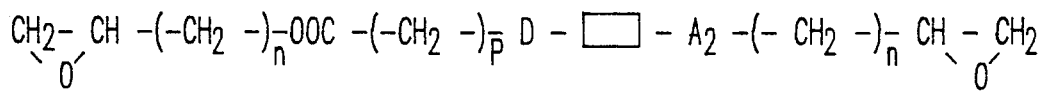

*FIG. 1*

THERMALLY RETICULATED MATERIALS FOR NON-LINEAR OPTICAL APPLICATIONS

BACKGROUND OF THE INVENTION

This invention consists of polymer materials that can be used in non-linear optical applications. More specifically, it concerns a new type of material in which the entities active in non-linear optics are capable of generating, in the presence of reticulating agents, a three-dimensional reticulated polymer network. The chemical structure of the entities that are active in non-linear optics is such that the materials they form are capable of generating second-order non-linear optical effects. The non-centrosymmetric property of the material, essential to obtain non-linear optical effects, is produced by applying a DC electrical field at the three-dimensional reticulated polymer network vitreous transition temperature.

Such materials can advantageously be used to produce components for integrated optics, such as frequency doublers operating at wavelengths between 0.8 and 2 $\mu$m, or electrooptical modulators using an electromagnetic wave with a wavelength between 0.6 and 2 $\mu$m. It has been clearly shown that organic materials can possess non-linear optical dynamics as high as those offered by inorganic materials such as lithium niobate or KTP, but also offer decisive advantages such as:

- optical damage only occurs at a higher limit,
- a shorter response time (sub-picosecond),
- the flexibility of organic synthesis allows the physical properties to be adjusted,
- a potentially lower cost.

DESCRIPTION OF THE PRIOR ART

Of all organic materials, polymers seem to be the most suitable for integrated optics. Up to present, the polymer materials proposed for second-harmonic generators or electrooptical modulators are:

- solid solutions of small molecules (or coloring agents) with active non-linear optical properties, dissolved in a matrix of amorphous polymer or a liquid crystal polymer,
- copolymers in which the entity acted in non-linear optics is grafted onto the copolymer structure, which overcomes the problems of solubility of coloring molecules in the polymer matrix and provides materials which can contain up to 100% active molecules.

Nonetheless, although the non-linear properties of copolymers are more stable in time than those of solid solutions, they suffer from relaxation phenomena which affect the orientation of the colorants obtained after polymerization; these relaxation problems exclude their use on an industrial scale.

Several research teams have proposed several methods of overcoming these relaxation problems, all based on the reticulation principle. Schematically, there are two types of solution:

In the first type, the non-linear entities (A) and reticulation groups (B) are separate. They are grafted onto the same polymer structure and can be reticulated by temperature or a light source. A reticulated polymer, active in non-linear optics, can be obtained by orientating groups (A) under an electric field and at temperature. The type of polymer is described in Patent Request FR 88 05790 deposed by P. LE BARNY and his colleagues.

In the second type, the reticulation group (B) is directly bonded to the non-linear entity (A).

To this end, entity (A) can form the lateral chain of a polymer; a molecule (C), whose two ends include reticulation functions, makes it possible to obtain thermal or photochemical reticulation under a DC electrical field, to produce an oriented material whose lateral chains are bonded together by molecules (C). Such polymers are described in Patent Request FR 90 13041 deposed by S. MULLER and his colleagues.

Alternatively, entity (A) can be part of a small multifunction molecule whose two ends include reticulation groups (C). In this case, the small active molecules are bound together by the reticulation molecules (C). This type of structure is used by IBM (M. EICH, B. RECK, D. Y. YOON, C. WILLSON and G. C. BJORKLUND, J. Appl. Phys. 66 (7), 1989; B. RECK, M. EICH, D. JUNGBAUER, R. J. TWIEG, C. G. WILLSON, D. Y. YOON, G. C. BJORKLUND, SPIE 1147 "Non-linear optical properties of organic materials II", 74–83 (1989); D. JUNGBAUER, B. RECK, R. TWIEG, D. Y. YOON, C. G. WILLSON and D. J. SWALEN, Appl. Phys. Lett. 56 (26) (1990); it produces a network of active molecules bonded to each other.

Recently, a photoreticulated system, based on small molecules containing cinnamate functions dissolved in polyvinylcinnamate has been proposed (B. K. MANDAL, J. KUMAN, J. C. HUANG, S. TRIPHATHY, Makromol. Chem. Rapid. Commun. 12 63–68 (1991)).

Of all the systems already described, only those based on the thermal reticulation of molecules with amino functions by molecules with epoxy functions have given materials with active non-linear optical properties stable up to 80° C. The system offering the best performance was produced from the following two types of molecule:

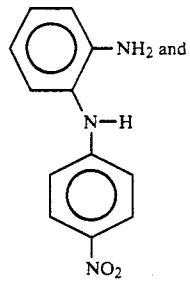

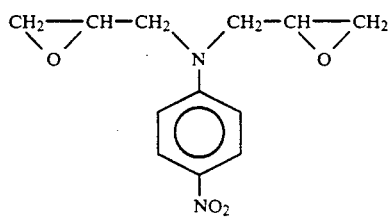

(D. JUNGBAUER, R. RECK, R. TWIEG, D. Y. YOON, C. G. WILLSON and J. D. SWALEN, Appl. Phys. Lett. 56 (26) 2610-2612 (1990)).

However, such a system has certain disadvantages:

Aromatic amines are only weakly reactive and must be cured for very long periods to produce the network. In addition, when the network does form, the non-linear groups set up lateral chains alongside the polymer structure without being bonded to it by rigid links. Rotary movements, as described below, are then possible and cause orientation relaxation in the system. Despite the formation of a network, the optically active molecules are only partially retained in their initial position, imposed when they were orientated under the electric field.

$$-\text{\Large\Square}-\text{\Large\Hexagon}-N=N-\text{\Large\Hexagon}-\text{ or}$$

[Structural diagram showing two -CH$_2$-CH(OH)-CH$_2$- groups connected via N atoms to phenyl-NO$_2$ rings and a dimethylamino-phenyl group, with arrows indicating free rotation.]

(free rotation.

Finally, the non-linear entities used in such a system do not have the high second-order optical susceptibility needed to obtain good performance in non-linear optics.

SUMMARY OF THE INVENTION

It is for this reason that this invention proposes new molecules, active in non-linear optics, which can be thermally reticulated and which comply with the following chemical formuli:

$$\underset{O}{CH_2\text{—}CH}\text{—}(CH_2)_n\text{OOC}\text{—}(CH_2)_p\text{D}\text{—}$$

$$-\boxed{\phantom{xx}}-\text{COO}\text{—}(CH_2)_n\text{CH}\underset{O}{\text{—}CH_2}\text{ or}$$
$$\phantom{-\boxed{\phantom{xx}}-}|$$
$$\phantom{xxxxxxx}A_1$$

$$\underset{O}{CH_2\text{—}CH}\text{—}(CH_2)_n\text{OOC}\text{—}(CH_2)_p\text{D}\text{—}$$

$$-\boxed{\phantom{xx}}-A_1$$
$$\text{COO}\text{—}(CH_2)_n\text{CH}\underset{O}{\text{—}CH_2}\text{ where }1\leq n\leq 5$$
$$1\leq p\leq 5$$

D being $\underset{\diagup}{\diagdown}\text{N}\text{—}$ where $1\leq m\leq 5$ or $\text{—O—}$
$\phantom{xxx}C_mH_{2m+1}$ $A_1$ being $-NO_2$ or $CN$ $-\boxed{\phantom{xx}}-$ being $-(\text{\Large\Hexagon})_x-$ where $x = 1$ or $x = 2$ or $-\text{\Large\Hexagon}-CH=CH-\text{\Large\Hexagon}-$ or -continued $-\text{\Large\Hexagon}-N=N-\text{\Large\Hexagon}-$ or $$\underset{O}{CH_2\text{—}CH}\text{—}(CH_2)_n\text{OOC}\text{—}(CH_2)_p\text{D}\text{—}$$

$$-\boxed{\phantom{xx}}-A_2\text{—}(CH_2)_n\text{CH}\underset{O}{\text{—}CH_2}\text{ where }1\leq n\leq 5$$
$$1\leq p\leq 5$$

D being $-\underset{|}{N}\text{—}$ where $1\leq m\leq 5$ or $\text{—O—}$
$\phantom{xx}C_mH_{2m+1}$ $A_2$ being $-\underset{\|}{C}\text{—}$ or $-COO-$
$\phantom{xxxx}O$ $-\boxed{\phantom{xx}}-$ being $-(\text{\Large\Hexagon})_x-$ where $x = 1$ or $x = 2$.

The major advantage of these molecules is that they can be reticulated at each end, thus helping to form a three-dimensional polymer network in which the orientation of active molecules is fixed by reticulation.

The inclusion of two reticulation functions along the major axis of the molecule allows the active orientation to be fixed, after polarization, more strongly than in the prior art. The chemical structure of the electron-donor non-linear entity (D), bonded to a group in which electrons can be delocalized (▭), this group being bonded to an electron acceptor function (A$_1$ or A$_2$), can be chosen to provide the required transparency to the operating wavelength. For example, the required absorption wavelength for an electrooptical modulator is below 700 nm, the required absorption wavelength for a green laser is below 350 nm and the required absorption wavelength for a blue laser is below 300 nm.

This invention is also a process to produce materials with stable active non-linear properties, using molecules (I) that are active in non-linear optics and can be reticulated, in which the reticulation of the said molecules (I) by multi-function aliphatic amino molecules (II) produces a reticulated polymer.

Multi-function aliphatic amines (II) can be of the following type:

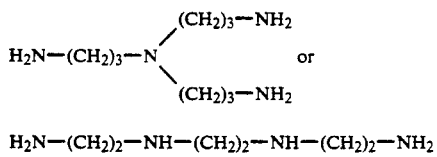

$$H_2N-(CH_2)_2-NH-(CH_2)_2-NH-(CH_2)_2-NH_2$$

Such amines are more reactive than the aromatic amines used in the prior art.

The process to produce a reticulated polymer with stable active non-linear optical properties complying with the invention preferably includes the following steps:

The production of a film (F) from a solution containing molecules (I) and molecules (II) by centrifugal deposition of the solution on a conductive substrate.

Preliminary curing of the film (F) by progressively heating it following temperature curves between 50° and 100° C.

Curing the film (F) at a temperature above 100° C., under a DC electrical field, produced by ionizing the air using a metal probe held at very high electrical potential.

BRIEF DESCRIPTION OF THE DRAWINGS

This invention will be better understood and other advantages will become clear upon reading the following description, which is not exhaustive, and by studying the appended figures, of which:

FIG. 1 shows the general formula of molecules that can be thermally reticulated and that are active in non-linear optics, complying with the invention.

The general formula of molecules complying with the invention is that shown in FIG. 1.

To obtain a reticulated polymer from such molecules, molecules (I) and molecules (II) are heated together to a temperature close to the vitreous transition temperature of the material being formed. In such a system, chemical reticulation takes place as the material is heated under the electric field. However, the vitreous transition temperature is not constant, since it increases as reticulation progresses. It is therefore necessary to allow for this variation in the vitreous transition temperature by progressively raising the system curing temperature so that the entities active in non-linear optics remain sufficiently mobile to complete the reticulation reactions and allow these active entities to be oriented under the DC electric field. The results of stability measurements, described below, show that the system formed is particularly stable, not only at ambient temperature, but also at temperatures of approx. 80° C.

EXAMPLE 1

Figure 2:
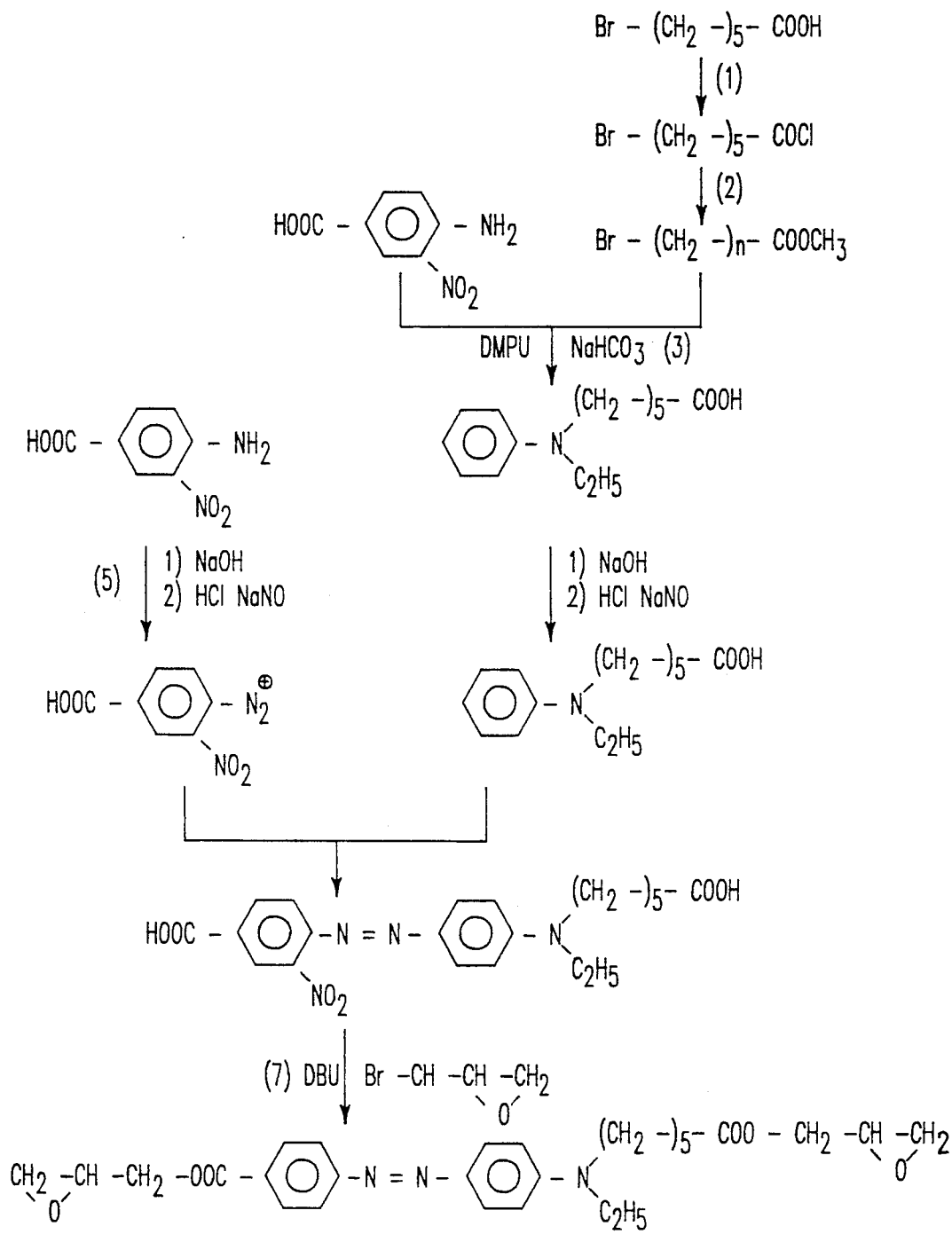
FIG. 2 is the reaction diagram for one example of molecules complying with the invention.

Synthesis of 4-[4(N ethyl N glycidic amino hexanoate) phenyl azo] 3 glycidic nitrobenzoate This product is synthesized in 6 steps, as shown in the reaction diagram in FIG. 2.

Synthesis of 6 bromohexanoyl chloride (Step 1)

58.5 g of (0.3 moles) of 6 bromohexanoic acid and 85 ml of oxalyl chloride are placed in a 250-ml flask with a magnetic agitator. The mixture is agitated and 1 milliliter of dimethylformamide (DMF) is added.

The reaction is allowed to continue for 1 hour at ambient temperature. The excess oxalyl chloride is then evaporated under a vacuum. This raw product is used without further purification.

Synthesis of 6 methyl bromohexanoate (Step 2)

0.3 moles of 6 bromohexanoyl chloride are dissolved in 150 ml of benzene. 26 g (0.34 moles) of methanol are added, applying cooling, and then 45 g (0.445 moles) of triethylamine in solution in 50 ml of benzene are added drop by drop. The mixture is agitated at ambient temperature for 16 hours. The reaction medium is then poured into water, acidified with HCl. The benzene is extracted. The raw product is then distilled under vacuum. This gives 43.7 g of ester with a boiling point of approx. 80° C. at a pressure of $2.25.10^{-2}$ Pa of mercury; the yield is 69.7 percent.

Synthesis of the methyl N ethyl N hexanoate aniline (Step 3)

12.1 g (0.1 moles) of N ethyl aniline, 23 g (0.11 moles) of methyl 6 bromohexanoate, 10 g (0.119 moles) of sodium hydrogenocarbonate and 1 ml of 336 aliquat are placed in 50 ml of 1.3-dimethyl-3,4,5,6-tetrahydro-2(1H)-pyrimidinone (DMPU) in a 250-ml flask with a magnetic agitator. The mixture is heated to 85° C. under agitation for 16 hours. After return to ambient temperature, the reaction medium is filtered to eliminate inorganic salts. The raw product is then distilled under vacuum. This produces 24.18 g of tertiary aniline, with a boiling point of approx. 162° C. at a pressure of $2.25.10^{-2}$ Pa of mercury; the yield $\rho = 80.9\%$.

Synthesis of acid N ethyl N hexanoic aniline (Step 4)

24.18 g of methyl N ethyl N hexanoate aniline are dissolved in 250 ml of a 20% alcohol solution of KOH and agitated for 1 hour.

The ethanol is evaporated under vacuum. The residue is washed with water then acidified by adding hydrochloric acid (HCl) at pH=4.

The ether is extracted.

Evaporation of the solvent produces 14.97 g of liquid acid; the yield $\rho = 64.9\%$.

Synthesis of 3-nitrobenzoic 4-[4(N ethyl N hexanoic amino acid) phenyl azo] acid 1.82 g (0.01 moles) of 3 nitro 4 aminobenzoic acid are dissolved hot in 33.3 ml of 0.3N soda in a beaker with a magnetic agitator. The solution is then acidified by adding 4.55 ml of 37% HCl. The chlorohydrate precipitates. The amino salt suspension is cooled to approx. 5° C. using a water-ice mixture. A solution of 0.75 g (0.011 moles) of sodium nitrite in 5.5 ml of water is then added drop by drop. The mixture is allowed to return to ambient temperature and agitated for 2 hours at ambient temperature. Insolubles are eliminated by filtration (Step 5).

In parallel, 2.35 g (0.01 moles) of N ethyl N hexanoic acid aniline are dissolved in 20 ml of ethanol and the diazonium salt prepared previously is added, drop by drop, to this solution at ambient temperature. A solid red precipitate forms (Step 6).

Agitation is continued 1 hour after adding the last drop, and the mixture is then cooled for one night in a refrigerator.

Insolubles are separated by filtration and then washed with water followed by hexane. They are dried under vacuum. This gives 2.16 g of diacid. The yield $\rho = 50.4\%$.

Synthesis of the 4-[4 (N ethyl N amino glycidic hexanoate) phenyl azo] 3-glycidic nitrobenzoate (Step 7)

0.428 g of 4-[4 (N ethyl N hexanoate amino acid) phenyl azo] 3-nitrobenzoic acid are dissolved in 5 ml of hexamethyl-phosphortriamide (HMPA) in a 10-ml flask. 0.304 g (0.002 moles) of 1.8-diazobiscyclo[5,4,0]-undec-7-ene (DBU) are added and the mixture is agitated 30 minutes at ambient temperature; finally, 0.274 g (0.002 moles) of epibromhidrin are added. After 1 h 20 min, a further 0.13 g of epibromhidrin are added. The reaction is stopped 2 h 30 min after it starts.

The reaction medium is poured into 400 ml of water + 50 ml of hexane under agitation. It is allowed to stand 1 night in a refrigerator and then filtered. This gives a pasty, raw material. This raw product is chromatographically purified twice over $SiO_2$ with $CHCl_3$ as the eluant.

This produces 0.154 g of diester with a yield of 28.5% and a boiling point F=45° C.

EXAMPLE 2

Synthesis of 4-[4 (amino glycidic N ethyl N butanoate) phenyl azo] 3 glycidic nitrobenzoate The synthesis is identical to that of the higher homologue described in Example 1.

| 4 methyl bromobutanoate | $E_7$ = 58–60° C. | $\rho$ = 56% |
| --- | --- | --- |
| N ethyl N methyl butanoate aniline | $E_5$ = 138–140° C. | $\rho$ = 30.5% |
| N ethyl N butanoic acid aniline | | $\rho$ = 81.5% |
| 4-[4 N ethyl N amino butanoic acid) phenyl azo] 3 nitro-benzoic acid | | $\rho$ = 50% |
| 4-[4 (N ethyl N amino glycidic butanoate) phenyl azo] 3 glycidic nitrobenzoate | | F = 109° C. |

Production of oriented reticulated films

The production of oriented and reticulated films from 4-[4 N ethyl N glycidic butanoate amino) phenyl azo] 3 glycidic nitrobenzoate [molecule (1)] and triethylenetetramine (TETA) [molecule (2)] will be described as an example.

To determine the general shape of the amino epoxy system curing temperature under an electrical field, we measured how the vitreous transition temperature of a stoechiometric mixture of 4-[4 (N ethyl N glycidic butanoate amino) phenyl azo] 3 glycidic nitrobenzoate and TETA, to which 5% by weight of polymethyl-methacrylate (PMMA) had been added, varied with temperature and the curing time.

The term "stoechiometric mixture" indicates that there is exactly the same amount of epoxy function as the >N—H function, or again:

$$\frac{[\text{diester}]}{[\text{TETA}]} = 3$$

Figure 3:
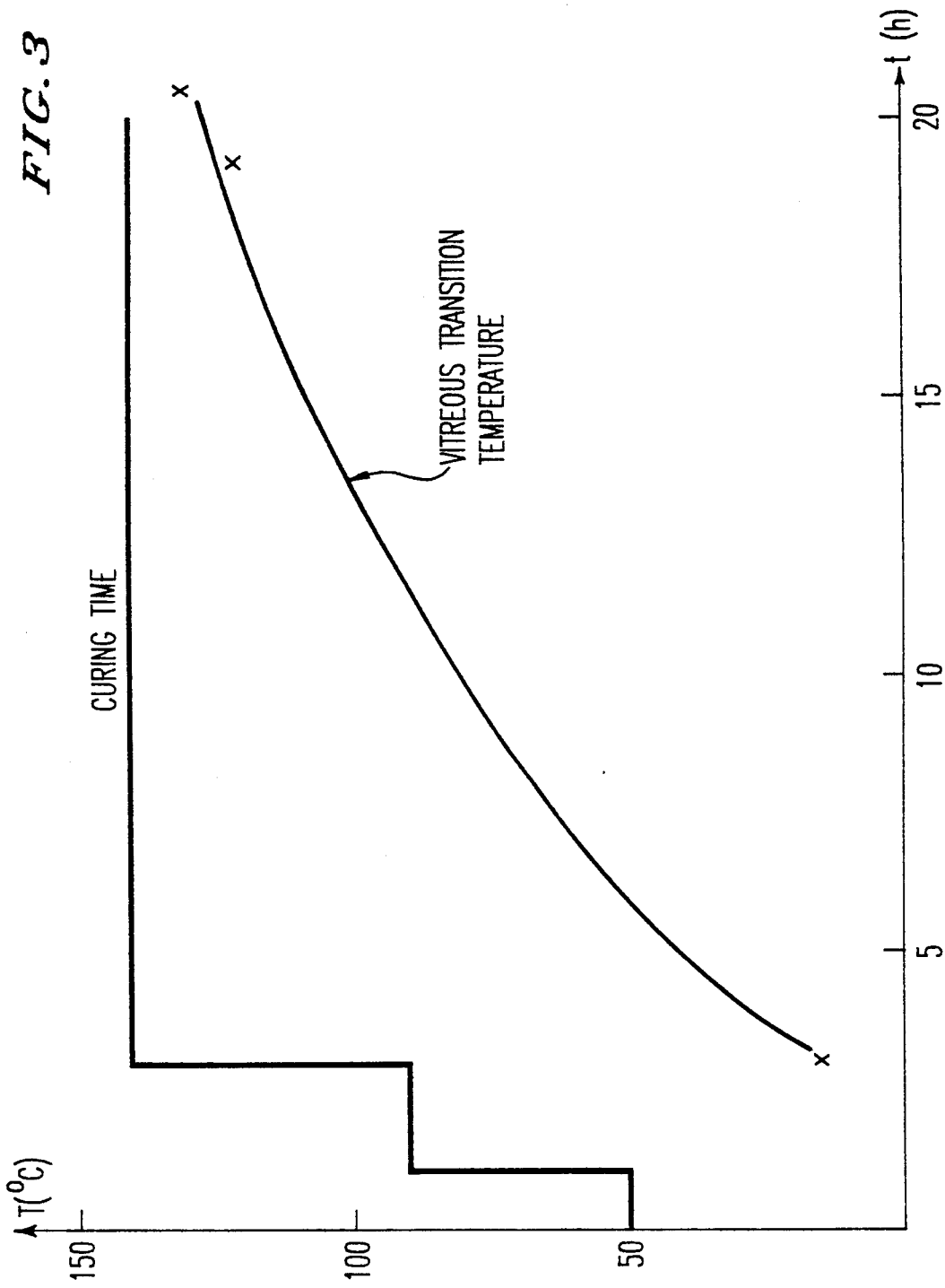
FIG. 3 shows an example of the temperature curves applied to the material during formation complying with the invention, and the variation of the vitreous transition temperature relative to these curves.

PMMA is added to present crazing when the film is reticulated. FIG. 3 summarizes the results.

Production of a thin film:

The following 3 solutions are prepared:

| 100 mg of diester | in 0.597 g of $CHCl_3$ | (1) |
| --- | --- | --- |
| 94.9 mg of TETA | in 4.476 g of $CHCl_3$ | (2) |
| 70 mg of (PMMA) | in 4.476 g of $CHCl_3$ | (3) |

Solution (2) and 0.455 g of solution (3) are added to solution (1). The solution (4) obtained is passed through a 0.2 μm Millipore filter and deposited on a glass slide, coated with ITO, in a centrifuge (2000 rpm).

We then determined the variation in the material vitreous transition temperature as a function of temperature and curing time. FIG. 3 shows the variation.

Preliminary curing

The aim of this step is to produce a prepolymer before the polarization field is applied.

Figure 4:
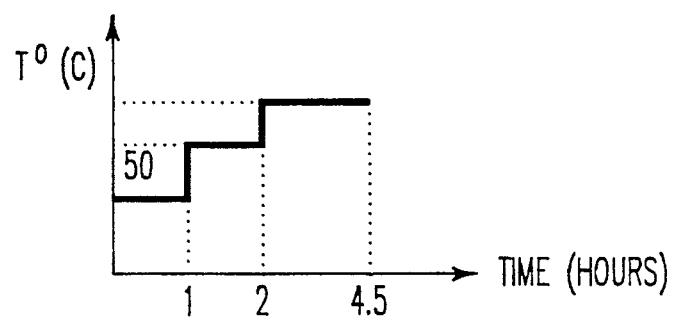
FIG. 4 shows the temperature curves applied to the material to be polarized.
Figure 5:
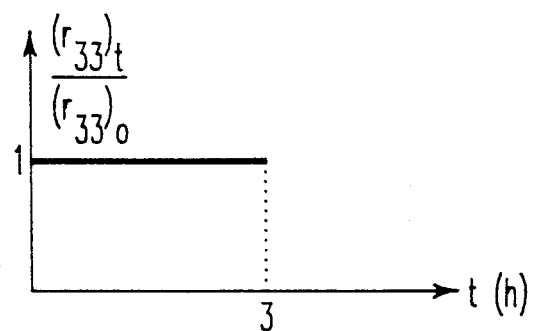
FIG. 5 shows the electrooptical response of the material complying with the invention, after treatment at the temperatures shown in FIG. 4 and as a function of time at a temperature of 80° C.

The film is heated under $N_2$, following the temperature curve, against time. FIG. 4 shows the temperature curve.

Polarization

The film is then heated to 140° C. for 15 hours under a nitrogen atmosphere and in the presence of a DC electric field generated by a metal probe held at very high electrical potential to ionize the air and thus create an electric field at the film level (the Corona method).

The film is then cooled, still under the electric field.

Stability test

The electrooptical coefficient $(r_{33})_0$ is measured at ambient temperature and at 1.32 μm.

The film is then heated to 80° C. for 3 h.

FIG. 4 represents the variation in the ratio $(r_{33})_t/(r_{33})_0$ as a function of time and indicates the excellent stability of the material complying with the invention.

When heated to 130° C. for 30 min, the film loses only 15% of its second-order non-linear optical properties.

What is claimed is:

1. Molecules with active non-linear optical properties which can be reticulated thermally, having the following chemical formuli:

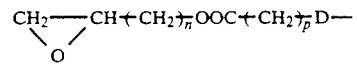

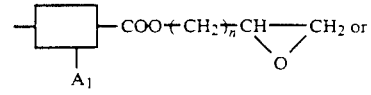

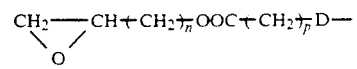

-continued

COO—(CH₂)ₙ—CH——CH₂  where 1 ≦ n ≦ 5
         \\_O_/          1 ≦ p ≦ 5

D being  \\N—where 1 ≦ m ≦ 5 or —O—
         /
      CmH₂m+1

A₁ being —NO₂ or CN

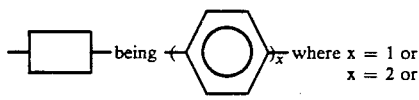

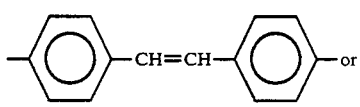

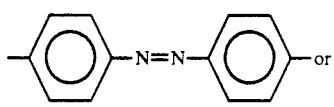

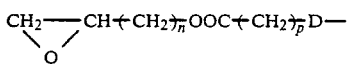

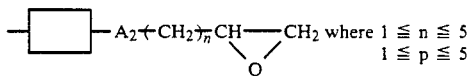

D being —N—where 1 ≦ m ≦ 5 or —O—
        |
     CmH₂m+1

-continued

A₂ being —C— or —COO—
         ‖
         O

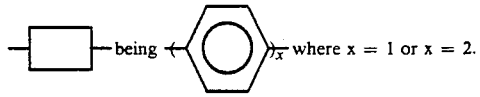

2. A process to produce materials with stable, active, non-linear, optical properties, using molecules (I) as described in claim 1, which comprises reticulating molecules (I) with multi-functional aliphatic amine molecules (II) to form a reticulated polymer.

3. A production process as described in claim 2 in which the molecules (II) has the following chemical formula:

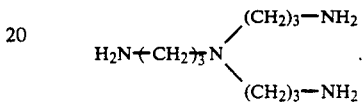

4. A production process as described in claim 2 in which the molecules (II) has the following chemical formula:

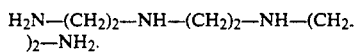

5. A process according to any one of claims 2 to 4 to produce materials with stable, active, non-linear, optical properties, which includes the following steps:
   producing a film (F) from a solution containing molecules (I) and molecules (II), by centrifugally depositing the solution on a conductive substrate;
   preliminary curing of the film (F) by heating the film between from 50° to 100° C.;
   curing the film (F) at a temperature above 100° C. under a DC electrical field, said field being produced by ionizing air with a metal probe held at a sufficient electrical potential to ionize said air.

* * * * *

UNITED STATES PATENT AND TRADEMARK OFFICE
CERTIFICATE OF CORRECTION

PATENT NO. : 5,294,463
DATED : March 15, 1994
INVENTOR(S) : Pierre LE BARNY, et al.

It is certified that error appears in the above-indentified patent and that said Letters Patent is hereby corrected as shown below:

On the title page, Item [73], the Assignee's name should read as follows:

--Thomson-CSF--

Signed and Sealed this

Nineteenth Day of July, 1994

Attest:

BRUCE LEHMAN

Attesting Officer      Commissioner of Patents and Trademarks